United States Patent
Qian et al.

(10) Patent No.: US 10,671,242 B2
(45) Date of Patent: Jun. 2, 2020

(54) DISPLAYING A DESKTOP ICON WITH MULTIPLE COLOR SETS USING A MOVING ANGLE OF A MOBILE TERMINAL

(71) Applicant: HUAWEI TECHNOLOGIES CO., LTD., Shenzhen, Guangdong (CN)

(72) Inventors: Kai Qian, Beijing (CN); Liwei Huang, Beijing (CN); Jianhua Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 15/694,225

(22) Filed: Sep. 1, 2017

(65) Prior Publication Data
US 2017/0364241 A1 Dec. 21, 2017

Related U.S. Application Data

(63) Continuation of application No. PCT/CN2015/073514, filed on Mar. 2, 2015.

(51) Int. Cl.
*G06F 3/0481* (2013.01)
*G06F 9/451* (2018.01)
(Continued)

(52) U.S. Cl.
CPC ........ *G06F 3/04817* (2013.01); *G06F 1/1694* (2013.01); *G06F 3/0346* (2013.01);
(Continued)

(58) Field of Classification Search
CPC ............. G06F 3/04817; G06F 3/04845; G06F 2203/04804; G06T 11/001
See application file for complete search history.

(56) References Cited

U.S. PATENT DOCUMENTS 7,573,487 B1* 8/2009 Petersen ............. G06F 3/04817
345/592
8,160,392 B1* 4/2012 Chien .................... G06T 11/60
382/284
(Continued)

FOREIGN PATENT DOCUMENTS

CN 101213509 A 7/2008
CN 101916168 12/2010
(Continued)

OTHER PUBLICATIONS

YouTube video, M. Bronwlee, Nokia Lumia 1520 Review!, published Dec. 17, 2013, downloaded from https://www.youtube.com/watch?v=IVPAfntOfmc (Year: 2013).*
(Continued)

*Primary Examiner* — Jennifer N To
*Assistant Examiner* — Eric J Yoon
(74) *Attorney, Agent, or Firm* — Conley Rose, P.C.

(57) ABSTRACT

The present invention discloses a desktop icon display method and a mobile terminal, relates to the field of mobile communications, and enhances a visual effect, of a user desktop icon, produced when the mobile terminal is shaken. The display method provided by the present invention is applied to a mobile terminal. A desktop icon is displayed on a display screen of the mobile terminal by using a first color set; a moving angle of the mobile terminal is obtained; and if the moving angle of the mobile terminal exceeds a preset angle, the desktop icon is displayed by using a second color set.

18 Claims, 4 Drawing Sheets

(51) Int. Cl.
*G06F 1/16* (2006.01)
*G06F 3/0346* (2013.01)
*G06T 11/00* (2006.01)

(52) U.S. Cl.
CPC ............ *G06F 9/451* (2018.02); *G06T 11/001* (2013.01); *G06F 2200/1637* (2013.01); *G06T 2200/24* (2013.01)

(56) References Cited

U.S. PATENT DOCUMENTS

| | | |
|---|---|---|
| 2005/0213853 A1 | 9/2005 | Maier et al. |
| 2009/0091542 A1 | 4/2009 | Inaba et al. |
| 2012/0133677 A1 | 5/2012 | Suzuki et al. |
| 2012/0165071 A1 | 6/2012 | Hsu et al. |
| 2012/0313946 A1 | 12/2012 | Nakamura et al. |
| 2014/0009387 A1* | 1/2014 | Hwang ............... G06F 3/03 345/156 |
| 2015/0213632 A1* | 7/2015 | Trask ............... G06T 11/60 715/234 |
| 2017/0153716 A1 | 6/2017 | Miyazawa et al. |
| 2017/0277229 A1 | 9/2017 | Suzuki et al. |

FOREIGN PATENT DOCUMENTS

| | | |
|---|---|---|
| CN | 102446007 A | 5/2012 |
| CN | 102479053 A | 5/2012 |
| CN | 102541414 | 7/2012 |
| CN | 103455333 | 12/2013 |
| CN | 103456249 | 12/2013 |
| CN | 103970447 A | 8/2014 |
| CN | 104361556 A | 2/2015 |
| EP | 2 426 574 A2 | 3/2012 |
| EP | 3 211 592 A1 | 8/2017 |
| JP | 2005251193 A | 9/2005 |
| JP | 2012113600 A | 6/2012 |
| JP | 2012155555 A | 8/2012 |
| JP | 2013003671 A | 1/2013 |
| JP | 2014174649 A | 9/2014 |
| KR | 1020080019266 A | 3/2008 |
| WO | 2007007682 A1 | 1/2007 |
| WO | 2009154837 A1 | 12/2009 |

OTHER PUBLICATIONS

Extended European Search Report dated Feb. 12, 2018, in corresponding European Patent Application No. 15883677.5, 8 pgs.
Office Action, dated Dec. 7, 2018, in Korean Application No. 1020177027482 (7 pp.).
Notice of Reason(s) for Rejection, dated Sep. 25, 2018, in Japanese Application No. 2017546183 (7 pp.).
International Search Report, dated Dec. 2, 2015, in International Application No. PCT/CN2015/073514 (4 pp.).
International Search Report, dated Dec. 2, 2015, in International Application No. PCT/2015/073514, pp. 1-5.
Machine Translation and Abstract of Chinese Publication No. CN101213509, Jul. 2, 2008, 6 pages.
Machine Translation and Abstract of Chinese Publication No. CN103970447, Aug. 6, 2014, 10 pages.
Foreign Communication From a Counterpart Application, Chinese Application No. 201580077405.8, Chinese Office Action dated Apr. 30, 2019, 7 pages.
Foreign Communication From a Counterpart Application, European Application No. 15883677.5, European Office Action dated Apr. 11, 2019, 8 pages.

* cited by examiner

DISPLAYING A DESKTOP ICON WITH MULTIPLE COLOR SETS USING A MOVING ANGLE OF A MOBILE TERMINAL

CROSS-REFERENCE TO RELATED APPLICATIONS

This application is a Continuation of International Application No. PCT/CN2015/073514, filed on Mar. 2, 2015, which is hereby incorporated by reference in its entirety.

TECHNICAL FIELD

The present invention relates to the field of mobile communications, and in particular, to a desktop icon display method and a mobile terminal.

BACKGROUND

With development of science and technologies, various electronic products are widely applied to the modern life. With a handheld computer or a mobile phone as an example, a mobile terminal has become an essential working and living tool in people's daily life. As a basic use function of a mobile terminal is close to perfection, people impose increasingly high requirements for a personalized function of the mobile terminal. A function that embodies personality has become a consideration in selecting a mobile terminal by a user and a significant factor that determines whether a mobile terminal manufacturer can succeed in business. As the first entrance of a mobile terminal, a user desktop of the mobile terminal is the first window of personalized presentation.

A display screen of a mobile terminal generally has elements such as wallpaper, an icon, and a plug-in. Currently, personalized presentation of a display screen of a mobile terminal is limited to only use of dynamic wallpaper and/or changes between user desktops in different styles, to bring different visual effects to a user. However, in this presentation manner, once a desktop icon on a user interface is displayed on the mobile terminal, a moving track, a color, a shape, and the like of the desktop icon are fixed. This brings a user a static and stiff visual effect. Apparently, this is not suitable for a development requirement of a user for diversification and personalization, and urgently needs to be improved.

SUMMARY

Embodiments of the present invention provide a desktop icon display method and a mobile terminal, so as to resolve an existing problem that a displayed color of a desktop icon is fixed.

To achieve the foregoing objective, the following technical solutions are used in the embodiments of the present invention:

According to a first aspect, an embodiment of the present invention provides a desktop icon display method, which is applied to a mobile terminal. The method includes:

displaying a desktop icon on a display screen of the mobile terminal by using a first color set;

obtaining a moving angle of the mobile terminal; and if the moving angle of the mobile terminal exceeds a preset angle, displaying the desktop icon by using a second color set.

With reference to the first aspect, in a first possible implementation manner of the first aspect, along a direction of a z-axis, the display screen sequentially includes a wallpaper layer, an image layer at which the desktop icon is located, and a display layer overlaying the wallpaper layer and the image layer at which the desktop icon is located, where horizontal coordinates of the display layer are in a one-to-one correspondence respectively with horizontal coordinates of the wallpaper layer and horizontal coordinates of the image layer at which the desktop icon is located; the z-axis is a coordinate axis perpendicular to the display screen; and the horizontal coordinates include a coordinate in a direction of an x-axis and a coordinate in a direction of a y-axis, and a horizontal plane on which the x-axis and the y-axis are located is parallel with the display screen; and the displaying the desktop icon by using a second color set includes:

obtaining, according to the obtained moving angle, a first area that is corresponding to the desktop icon and that is at the wallpaper layer;

performing combination calculation on color values of all coordinate points in the first area and color values of all coordinate points of the desktop icon, to form a series of combined color values that are in a one-to-one correspondence with horizontal coordinate points of the desktop icon, where a set of the color values of all the coordinate points of the desktop icon is the first color set, and a set of the combined color values that are in a one-to-one correspondence with the horizontal coordinate points of the desktop icon is the second color set; and respectively displaying, on the horizontal coordinates of the display layer, colors corresponding to the combined color values that are obtained after the combination calculation and that are corresponding to all the horizontal coordinate points of the desktop icon.

With reference to the first possible implementation manner of the first aspect, in a second possible implementation manner of the first aspect, the obtaining, according to the obtained moving angle, a first area that is corresponding to the desktop icon and that is at the wallpaper layer includes:

obtaining a first moving angle of a connection line between a preset reference object and the desktop icon in relative to the x-axis and a second moving angle of the connection line between the preset reference object and the desktop icon in relative to the y-axis; and obtaining, according to the first moving angle, the second moving angle, and a distance between the wallpaper layer and the image layer at which the desktop icon is located, the first area that is corresponding to the desktop icon and that is at the wallpaper layer.

For a first coordinate point (x,y) of the desktop icon, the obtaining, according to the first moving angle, the second moving angle, and the distance between the wallpaper layer and the image layer at which the desktop icon is located, a coordinate point (x1,y1) that is in the first area and that is corresponding to the first coordinate point of the desktop icon includes:

$$(x1, y1) = (x - D \times^{\tan \alpha}, y - D \times^{\tan \beta}), \text{ where}$$

D is the distance between the wallpaper layer and the image layer at which the desktop icon is located, "tan" is a tangent function, $\alpha$ is the first moving angle, and $\beta$ is the second moving angle.

With reference to the second possible implementation manner of the first aspect, in a third possible implementation manner of the first aspect, for a first coordinate point (x,y) of the desktop icon, the obtaining, according to the moving angles and the distance between the wallpaper layer and the image layer at which the desktop icon is located, a coordinate point (x1,y1) that is in the first area and that is corresponding to the first coordinate point of the desktop icon includes:

$$(x1,y1)=(x-D\times^{\tan \alpha}, y-D\times^{\tan \beta}), \text{ where}$$

D is the distance between the wallpaper layer and the image layer at which the desktop icon is located, "tan" is a tangent function, α is the first moving angle, and β is the second moving angle.

With reference to either implementation manner of the first possible implementation manner of the first aspect and the second possible implementation manner of the first aspect, in a fourth possible implementation manner of the first aspect, the performing combination calculation on color values of all coordinate points in the first area and color values of all coordinate points of the desktop icon includes:

performing addition and/or subtraction calculation on a color value of each coordinate point in the first area and a color value of each coordinate point of the desktop icon; or filtering out one or more color values from the color values of all the coordinate points in the first area first, and performing addition and/or subtraction calculation on a color value that is obtained after the filtering and that is of each coordinate point in the first area and a color value of each coordinate point of the desktop icon.

According to a second aspect, an embodiment of the present invention provides a mobile terminal, where the mobile terminal includes: a display unit, configured to display a desktop icon on a display screen of the mobile terminal by using a first color set; and an obtaining unit, configured to obtain a moving angle of the mobile terminal, where the display unit is further configured to: if the moving angle of the mobile terminal exceeds a preset angle, display the desktop icon by using a second color set.

With reference to the second aspect, in a first possible implementation manner of the second aspect, along a direction of a z-axis, the display screen sequentially includes a wallpaper layer, an image layer at which the desktop icon is located, and a display layer overlaying the wallpaper layer and the image layer at which the desktop icon is located, where horizontal coordinates of the display layer are in a one-to-one correspondence respectively with horizontal coordinates of the wallpaper layer and horizontal coordinates of the image layer at which the desktop icon is located; the z-axis is a coordinate axis perpendicular to the display screen; and the horizontal coordinates include a coordinate in a direction of an x-axis and a coordinate in a direction of a y-axis, and a horizontal plane on which the x-axis and the y-axis are located is parallel with the display screen;

the obtaining unit is further configured to obtain, according to the obtained moving angle, a first area that is corresponding to the desktop icon and that is at the wallpaper layer;

the mobile terminal further includes:

a calculation unit, configured to perform combination calculation on color values of all coordinate points in the first area obtained by the obtaining unit and color values of all coordinate points of the desktop icon, to form a series of combined color values that are in a one-to-one correspondence with horizontal coordinate points of the desktop icon, where a set of the color values of all the coordinate points of the desktop icon is the first color set, and a set of the combined color values that are in a one-to-one correspondence with the horizontal coordinate points of the desktop icon is the second color set; and the display unit is specifically configured to respectively display, on the horizontal coordinates of the display layer, colors that are corresponding to the combined color values obtained after the combination calculation and that are corresponding to all the horizontal coordinate points of the desktop icon.

With reference to the first possible implementation manner of the second aspect, in a second possible implementation manner of the second aspect, the obtaining unit is specifically configured to:

obtain a first moving angle of a connection line between a preset reference object and the desktop icon in relative to the x-axis and a second moving angle of the connection line between the preset reference object and the desktop icon in relative to the y-axis; and obtain, according to the first moving angle, the second moving angle, and a distance between the wallpaper layer and the image layer at which the desktop icon is located, the first area that is corresponding to the desktop icon and that is at the wallpaper layer.

With reference to the second possible implementation manner of the second aspect, in a third possible implementation manner of the second aspect, for a first coordinate point (x,y) of the desktop icon, the obtaining unit is specifically configured to:

obtain, according to a formula $(x1,y1)=(x-D\times^{\tan \alpha}, y-D\times^{\tan \beta})$, a coordinate point (x1,y1) that is in the first area and that is corresponding to the first coordinate point, where D is the distance between the wallpaper layer and the image layer at which the desktop icon is located, "tan" is a tangent function, α is the first moving angle, and β is the second moving angle.

With reference to either implementation manner of the first possible implementation manner of the second aspect and the second possible implementation manner of the second aspect, in a fourth possible implementation manner of the second aspect, the calculation unit is specifically configured to:

perform addition and/or subtraction calculation on a color value of each coordinate point in the first area and a color value of each coordinate point of the desktop icon; or filter out one or more color values from the color values of all the coordinate points in the first area first, and perform addition and/or subtraction calculation on a color value that is obtained after the filtering and that is of each coordinate point in the first area and a color value of each coordinate point of the desktop icon.

According to a third aspect, an embodiment of the present invention provides a mobile terminal, where the mobile terminal has a display screen, one or more user input devices, a memory, and one or more processors configured to execute one or more programs stored in the memory, where the processor is configured to: display a desktop icon on the display screen of the mobile terminal by using a first color set;

obtain a moving angle of the mobile terminal; and if the moving angle of the mobile terminal exceeds a preset angle, display the desktop icon by using a second color set.

With reference to the third aspect, in a first possible implementation manner of the third aspect, along a direction of a z-axis, the display screen sequentially includes a wallpaper layer, an image layer at which the desktop icon is located, and a display layer overlaying the wallpaper layer and the image layer at which the desktop icon is located, where horizontal coordinates of the display layer are in a one-to-one correspondence respectively with horizontal coordinates of the wallpaper layer and horizontal coordinates of the image layer at which the desktop icon is located; the z-axis is a coordinate axis perpendicular to the display screen; and the horizontal coordinates include a coordinate in a direction of an x-axis and a coordinate in a direction of a y-axis, and a horizontal plane on which the x-axis and the y-axis are located is parallel with the display screen; and the processor is specifically configured to:

obtain, according to the obtained moving angle, a first area that is corresponding to the desktop icon and that is at the wallpaper layer;

perform combination calculation on color values of all coordinate points in the obtained first area and color values of all coordinate points of the desktop icon, to form a series of combined color values that are in a one-to-one correspondence with horizontal coordinate points of the desktop icon, where a set of the color values of all the coordinate points of the desktop icon is the first color set, and a set of the combined color values that are in a one-to-one correspondence with the horizontal coordinate points of the desktop icon is the second color set; and respectively display, on the horizontal coordinates of the display layer, colors that are corresponding to the combined color values obtained after the combination calculation and that are corresponding to all the horizontal coordinate points of the desktop icon.

With reference to the first possible implementation manner of the third aspect, in a second possible implementation manner of the third aspect, the processor is specifically configured to:

obtain a first moving angle of a connection line between a preset reference object and the desktop icon in relative to the x-axis and a second moving angle of the connection line between the preset reference object and the desktop icon in relative to the y-axis; and obtain, according to the first moving angle, the second moving angle, and a distance between the wallpaper layer and the image layer at which the desktop icon is located, the first area that is corresponding to the desktop icon and that is at the wallpaper layer.

With reference to the second possible implementation manner of the third aspect, in a third possible implementation manner of the third aspect, for a first coordinate point (x,y) of the desktop icon, the processor is specifically configured to:

obtain, according to a formula $(x1,y1)=(x-Dx^{\tan \alpha}, y-Dx^{\tan \beta})$, a coordinate point (x1,y1) that is in the first area and that is corresponding to the first coordinate point, where D is the distance between the wallpaper layer and the image layer at which the desktop icon is located, "tan" is a tangent function, $\alpha$ is the first moving angle, and $\beta$ is the second moving angle.

With reference to any one implementation manner of the first possible implementation manner of the third aspect to the second possible implementation manner of the third aspect, in a fourth possible implementation manner of the third aspect, the processor is specifically configured to:

perform addition and/or subtraction calculation on a color value of each coordinate point in the first area and a color value of each coordinate point of the desktop icon; or filter out one or more color values from the color values of all the coordinate points in the first area first, and perform addition and/or subtraction calculation on a color value that is obtained after the filtering and that is of each coordinate point in the first area and a color value of each coordinate point of the desktop icon.

It can be learned from this that, the embodiments of the present invention provide a desktop icon display method. When a moving angle of a mobile terminal exceeds a preset angle, a desktop icon that has a first color set is displayed by using a second color set. In this way, when the mobile terminal continuously moves in different angles, a displayed color of the desktop icon continuously changes, so that a colorful lattice window effect may be dynamically presented on the desktop icon. This enhances a display effect of the desktop icon when the mobile terminal moves.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention provide a desktop icon display method, which is applicable to a mobile terminal. The mobile terminal may be a terminal device, such as a mobile phone, a tablet computer, a notebook computer, an ultra-mobile personal computer (ultra-mobile personal computer, Acronym: UMPC), a netbook, or a personal digital assistant (personal digital assistant, Acronym: PDA). A desktop icon may include an application program icon and a common control, such as a button, text, a progress bar, a check box, and an option button, and has a first color set.

Embodiment 1

Figure 1:
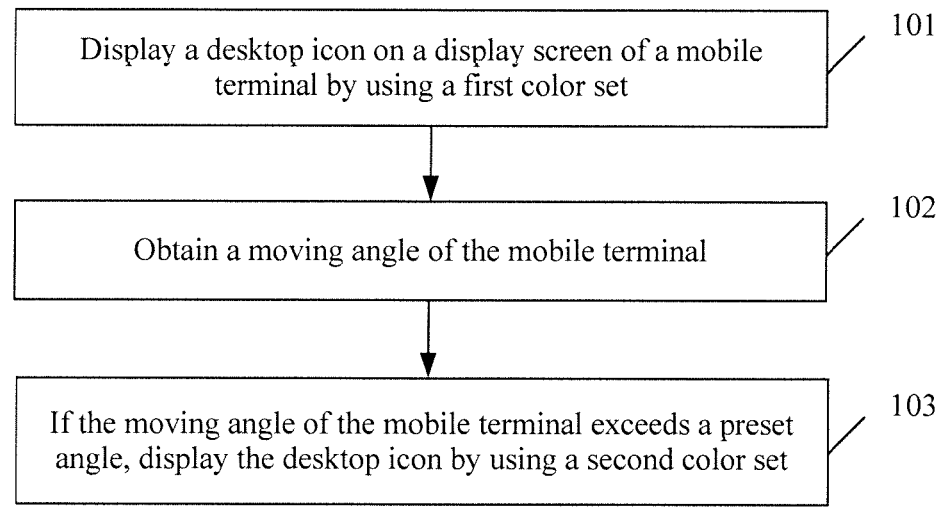
FIG. 1 is a flowchart of a desktop icon display method according to an embodiment of the present invention.

FIG. 1 shows a flowchart of a desktop icon display method according to this embodiment of the present invention. As shown in FIG. 1, the method may include the following steps.

101. Display a desktop icon on a display screen of a mobile terminal by using a first color set.

The first color set includes color values of all coordinate points of the desktop icon.

102. Obtain a moving angle of the mobile terminal.

Preferably, in this embodiment of the present invention, after the mobile terminal is started or under a specific trigger condition, the mobile terminal may detect a moving angle upon moving of the mobile terminal by using an acceleration sensor (for example, a gravity sensor or a gyroscope) installed in the mobile terminal. The moving may be an action event, such as an up-and-down shake and/or a left-and-right shake.

103. If the moving angle of the mobile terminal exceeds a preset angle, display the desktop icon by using a second color set.

The preset angle may be set according to a requirement, and this embodiment of the present invention sets no limitation thereto. The second color set includes color values that are different from first color values and that are in a one-to-one correspondence with all coordinate points of the desktop icon. It should be noted that colors in the second color set may be identical, or may be different, and this embodiment of the present invention sets no limitation thereto. In this embodiment of the present invention, when the mobile terminal moves, the desktop icon is displayed only by using the second color set that is different from the first color set.

Specifically, in this embodiment of the present invention, the display screen includes an x-axis and a y-axis in three-dimensional space. A z-axis is perpendicular to the display screen. The preset angle includes an x-axis preset angle, a y-axis preset angle, and a z-axis preset angle.

Correspondingly, determining that the moving angle of the mobile terminal exceeds the preset angle may include:

detecting in real time movements in three directions: a direction of the x-axis, a direction of the y-axis, and a direction of the z-axis; and if a relative moving angle of the mobile terminal in one or more directions of the direction of the x-axis, the direction of the y-axis, and the direction of the z-axis exceeds a preset angle in a corresponding direction, determining that the moving angle of the mobile terminal exceeds the preset angle.

For example, the x-axis preset angle is 10 degrees, the y-axis preset angle is 5 degrees, and the z-axis preset angle is 15 degrees. If it is detected that the relative moving angle of the mobile terminal in the direction of the x-axis is 5 degrees, the relative moving angle in the direction of the y-axis is 6 degree, and the relative moving angle in the direction of the z-axis is 10 degrees, it is determined that the moving angle of the mobile terminal exceeds the preset angle.

It can be learned from this that, this embodiment of the present invention provides a desktop icon display method. When a moving angle of a mobile terminal exceeds a preset angle, a desktop icon that has a first color set is displayed by using a second color set. In this way, when the mobile terminal continuously moves in different angles, a displayed color of the desktop icon continuously changes, so that a colorful lattice window effect may be dynamically presented on the desktop icon. This enhances a display effect of the desktop icon when the mobile terminal moves.

Embodiment 2

Figure 2:
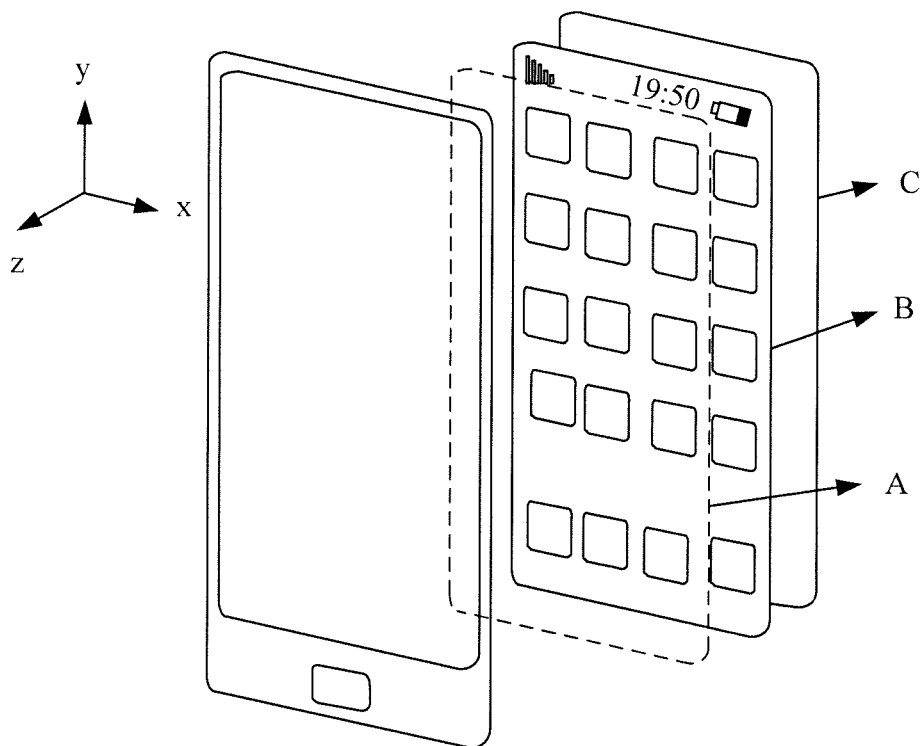
FIG. 2 is a schematic diagram of a display screen according to an embodiment of the present invention.

Generally, a display screen of a mobile terminal may include an image layer at which wallpaper is located and an image layer at which a desktop icon is located. However, in this embodiment of the present invention, a display layer overlaying the foregoing two image layers is added to implement a visual effect that a color of a desktop icon changes with a location of a mobile terminal. As shown in FIG. 2, image layers included by the display screen of the mobile terminal are sequentially A, B, and C from top to bottom (observed from a side presented by the mobile terminal to a user). A is the display layer, B is the image layer at which the desktop icon is located, and C is a wallpaper layer. A plane on which the display screen of the mobile terminal is located is a plane including a direction of an x-axis and a direction of a y-axis. An overlaying direction of the three image layers (a direction perpendicular to the mobile terminal) is a direction of a z-axis. Coordinates of the three image layers are in a complete mapping relationship in the direction of the x-axis and the direction of the y-axis, that is, horizontal coordinate points are in a one-to-one correspondence. It should be noted that in this embodiment of the present invention, in a moving process of the mobile terminal, the z-axis is always perpendicular to the display screen of the mobile terminal, and the display screen is always the plane including the x-axis and the y-axis. The wallpaper layer is a virtual layer including different coordinate points that are in a one-to-one correspondence with coordinate points of the image layer at which the desktop icon is located. Each coordinate point corresponds to one area of color value. The wallpaper layer may exist inside the mobile terminal, or may exist outside the mobile terminal, and this embodiment of the present invention sets no limitation thereto. This embodiment of the present invention is described by using only an example in which the wallpaper layer exists inside the display screen of the mobile terminal.

As the mobile terminal moves, the display layer may present different colors in a position corresponding to the desktop icon (namely, a position overlaying the desktop icon in the direction of the z-axis). The image layer at which the desktop icon is located is used to present a desktop icon. The wallpaper layer may be used to present wallpaper, and is an image layer that can present different colors, or an image layer with a transparency, for example, different areas of the wallpaper layer have different transparency. In addition, a distance d1 between the image layer at which the desktop icon is located and the wallpaper layer may be greater than or equal to 0, and a distance d2 between the image layer at which the desktop icon is located and the display layer may be greater than or equal to 0. Specific values of d1 and d2 are not limited in this embodiment of the present invention. Preferably, the display layer may be dynamically enabled or disabled. A user may enable the display layer when choosing to apply the desktop icon display method described in this embodiment of the present invention, or may disable the display layer when choosing to not apply the desktop icon display method described in this embodiment of the present invention.

In this embodiment of the present invention, when the user shakes the mobile terminal, a colorful lattice window visual effect may appear on the desktop icon to enhance a display effect of the desktop icon.

Figure 3:
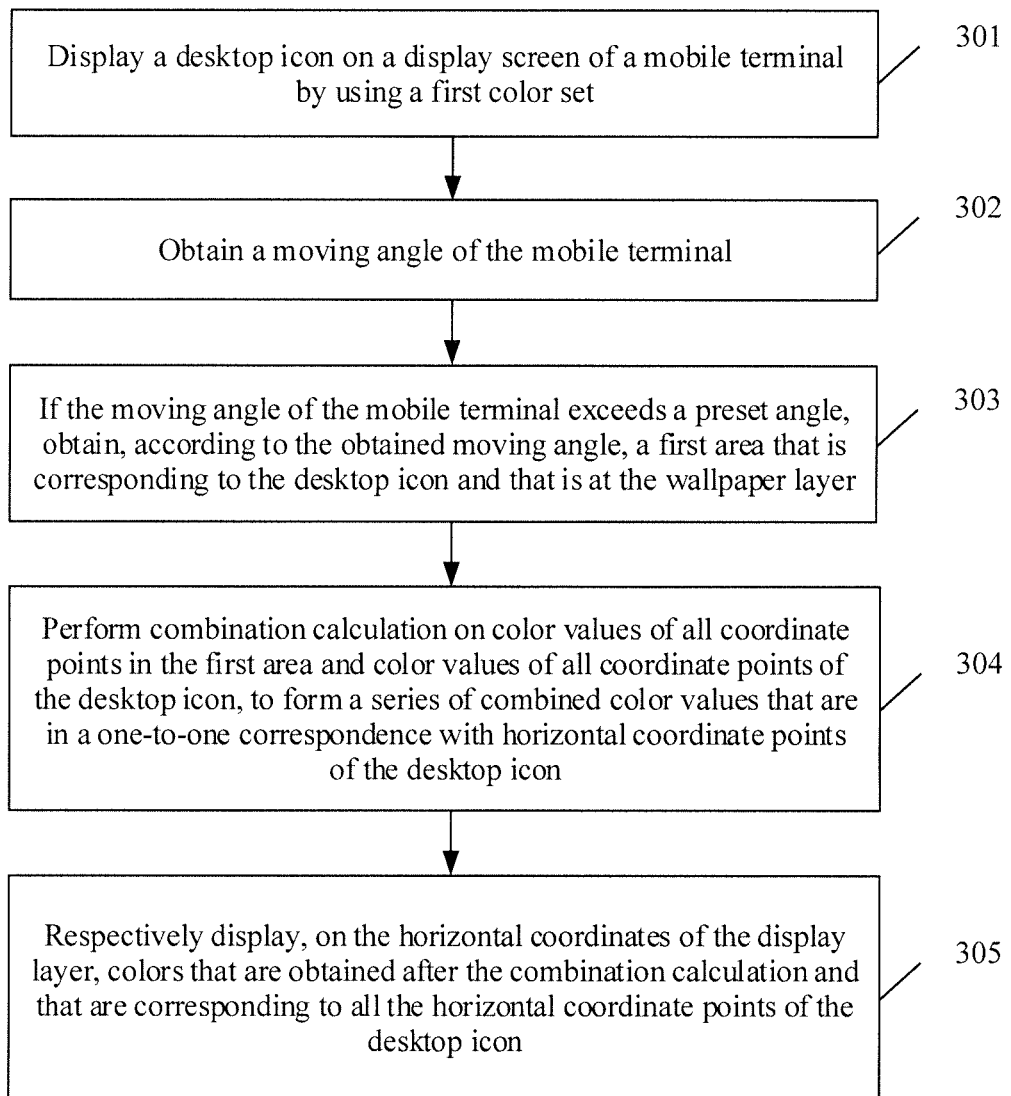
FIG. 3 is a flowchart of another desktop icon display method according to an embodiment of the present invention.

FIG. 3 shows a flowchart of another desktop icon display method according to an embodiment of the present invention. As shown in FIG. 3, the method may include the following steps.

301. Display a desktop icon on a display screen of a mobile terminal by using a first color set.

The first color set includes color values of all coordinate points of the desktop icon.

302. Obtain a moving angle of the mobile terminal.

A specific implementation manner of step 302 may be the same as the implementation manner of step 102 in Embodiment 1, and details are not described herein.

303. If the moving angle of the mobile terminal exceeds a preset angle, obtain, according to the obtained moving angle, a first area that is corresponding to the desktop icon and that is at the wallpaper layer.

For example, the obtaining, according to the obtained moving angle, a first area that is corresponding to the desktop icon and that is at the wallpaper layer may include:

obtaining a first moving angle of a connection line between a preset reference object and the desktop icon in relative to the x-axis and a second moving angle of the connection line between the preset reference object and the desktop icon in relative to the y-axis; and obtaining, according to the first moving angle, the second moving angle, and a distance between the wallpaper layer and the image layer at which the desktop icon is located, the first area that is corresponding to the desktop icon and that is at the wallpaper layer.

The preset reference object may be a reference object that has a fixed three-dimensional coordinate point and that is located inside or outside the mobile terminal, or may be a reference object whose coordinate point changes as the mobile terminal moves. A specific type of the reference object is not limited in this embodiment of the present invention. Only an object whose current three-dimensional coordinate point can be obtained is used as the reference object in the present invention. The first moving angle is a difference between an included angle at a current moment and an included angle at a previous moment, where both included angles are between the x-axis and a connection line between the reference object and the desktop icon. The second moving angle is a difference between an included angle at a current moment and an included angle at a previous moment, where both included angles are between the y-axis and the connection line between the reference object and the desktop icon.

Preferably, for a first coordinate point (x,y) of the desktop icon, obtaining a coordinate point (x1,y1) that is in the first area and that is corresponding to the first coordinate point may include:

$$(x1, y1) = (x - D \times^{\tan \alpha}, y - D \times^{\tan \beta}), \text{ where}$$

D is the distance between the wallpaper layer and the image layer at which the desktop icon is located, "tan" is a tangent function, α is the first moving angle, and β is the second moving angle.

It should be noted that a distance D between the wallpaper layer and the image layer at which the desktop icon is located is a virtual distance, and is used to calculate an area that is at the wallpaper layer and that is corresponding to the desktop icon. When choosing to apply the desktop icon display method described in this embodiment of the present invention, the user may enable the wallpaper layer and set the distance D between the wallpaper layer and the image layer at which the desktop icon is located. When choosing to not apply the desktop icon display method described in this embodiment of the present invention, the user may disable the wallpaper layer. In this case, the distance between the wallpaper layer and the image layer at which the desktop icon is located does not exist.

Figure 4:
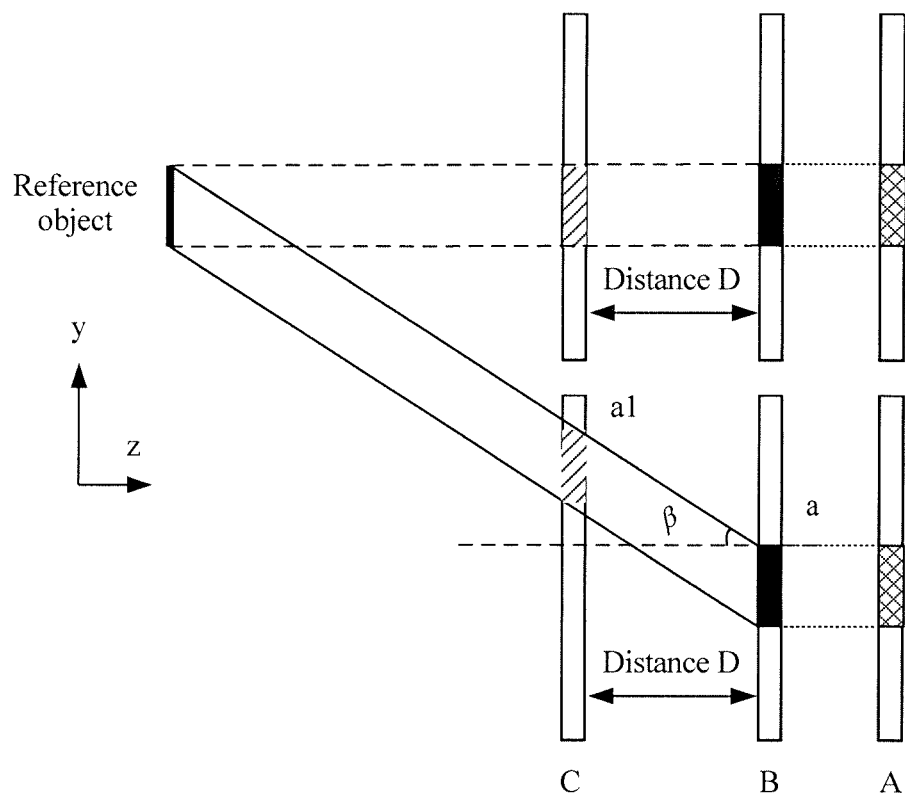
FIG. 4 is a schematic diagram of calculating an area that is at a wallpaper layer and that is corresponding to a desktop icon according to the present invention.

For example, FIG. 4 is a diagram of a cross section perpendicular to the direction of the x-axis. As shown in FIG. 4, the mobile terminal is shaken only along the direction of the y-axis. The included angle between the y-axis and the connection line between the reference object and the desktop icon inclines upward by β degrees from original 90 degrees, and the moving angle exceeds the preset angle of the y-axis. The included angle between the x-axis and the connection line between the reference object and the desktop icon remains unchanged: α is equal to 0 degrees. Therefore, an obtained point a1 is corresponding to a point a is (x, y−D×$^{\tan \beta}$).

304. Perform combination calculation on color values of all coordinate points in the first area and color values of all coordinate points of the desktop icon, to form a series of combined color values that are in a one-to-one correspondence with horizontal coordinate points of the desktop icon.

A set of the color values of all the coordinate points of the desktop icon is the first color set. A set of the combined color values that are in a one-to-one correspondence with the horizontal coordinate points of the desktop icon is the second color set. The color values of all the coordinate points in the first area may be pre-stored in the mobile terminal, or when the wallpaper layer displays wallpaper, displayed values of the wallpaper in the area may serve as the color values of all the coordinate points in the first area.

For example, the performing combination calculation on color values of all coordinate points in the first area and color values of all coordinate points of the desktop icon may include:

performing addition and/or subtraction calculation on a color value of each coordinate point in the first area and a color value of each coordinate point of the desktop icon; or filtering out one or more color values from the color values of all the coordinate points in the first area first, and performing addition and/or subtraction calculation on a color value that is obtained after the filtering and that is of each coordinate point in the first area and a color value of each coordinate point of the desktop icon.

It should be noted that the method for performing combination calculation on color values of all coordinate points in the first area and color values of all coordinate points of the desktop icon includes but is not limited to the foregoing two methods, and may further include another combination calculation method, and this embodiment of the present invention sets no limitation thereto.

For example, colors are represented by using red, blue, and green. If a color value of a specific coordinate point in the first area is 0x223344 (red 0x22, blue 0x33, and green 0x44), and a color value of a coordinate point that is corresponding to the specific coordinate point and that is on the desktop icon is 0x556644 (red 0x55, blue 0x11, and green 0x66), a result obtained after combination calculation on the color value of the coordinate point in the first area and the color value of the coordinate point on the desktop icon may be: 0x223344+0x556644=0x779988, or 0x556644−0x223344=0x333300; or the value of the red color is filtered out from the color value of the coordinate point in the first area first, and the color value of the coordinate point in the first area is changed to 0x003344; and the color value obtained after the filtering and the color value of the coordinate point of the desktop icon are added, and a result is: 0x003344+0x556644=0x559988; or the color value obtained after the filtering is subtracted from the color value of the coordinate point of the desktop icon, and a result is: 0x556644−0x003344=0x553300.

In this way, the color values that are obtained after the combination calculation and that are in a one-to-one correspondence with the horizontal coordinate points of the desktop icon may be obtained by means of step 304. For example, if a desktop icon includes 10 coordinate points, 10 color values that are obtained after combination calculation and that are in a one-to-one correspondence with the 10 coordinate points are obtained.

305. Respectively display, on the horizontal coordinates of the display layer, colors that are obtained after the combination calculation and that are corresponding to all the horizontal coordinate points of the desktop icon.

For example, for a first coordinate point (x,y) of the desktop icon, if a color value that is obtained after the combination calculation and that is corresponding to the first coordinate point is (0x223355), a color corresponding to the color value (0x223355) is displayed on a horizontal coordinate point (x,y) of the display layer.

It can be learned from this that, this embodiment of the present invention provides a desktop icon display method. When a moving angle of a mobile terminal exceeds a preset angle, an area that is corresponding to a desktop icon and that is at a wallpaper layer is obtained. After combination calculation is performed on a color value in the area and a first color set of the desktop icon, the desktop icon is displayed by using a second color set. In this way, when the mobile terminal continuously moves in different angles, a displayed color of the desktop icon continuously changes, so that a colorful lattice window effect may be dynamically presented on the desktop icon. This enhances a display effect of the desktop icon when the mobile terminal moves.

Embodiment 3

Figure 5:
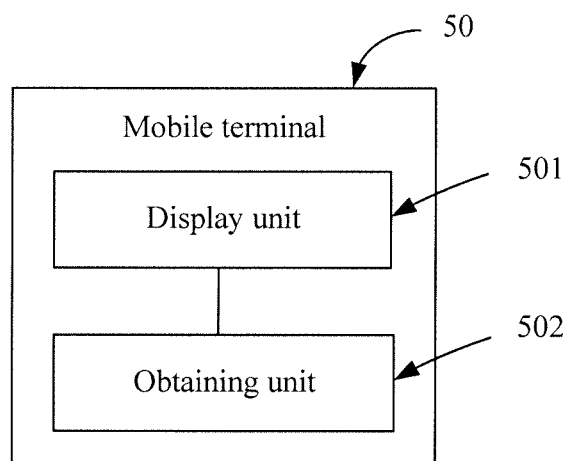
FIG. 5 is a structural diagram of a mobile terminal according to an embodiment of the present invention.

FIG. 5 shows a structural diagram of a display screen of a mobile terminal 50 according to this embodiment of the present invention. As shown in FIG. 5, the mobile terminal 50 may include a display unit 501 and an obtaining unit 502. The obtaining unit 502 may be an acceleration sensor installed in the mobile terminal, such as a gravity sensor or a gyroscope.

The display unit 501 is configured to display a desktop icon on a display screen of the mobile terminal by using a first color set.

The first color set includes color values of all coordinate points of the desktop icon.

The obtaining unit 502 is configured to obtain a moving angle of the mobile terminal.

The display unit 501 is further configured to: if the moving angle of the mobile terminal exceeds a preset angle, display the desktop icon by using a second color set.

The second color set includes color values that are different from first color values and that are in a one-to-one correspondence with all coordinate points of the desktop icon. It should be noted that colors in the second color set may be identical, or may be totally different, and this embodiment of the present invention sets no limitation thereto. In this embodiment of the present invention, when the mobile terminal moves, the desktop icon is displayed only by using the second color set that is different from the first color set.

The preset angle may be set according to a requirement, and this embodiment of the present invention sets no limitation thereto.

Further, in this embodiment of the present invention, the display screen includes an x-axis and a y-axis in three-dimensional space. A z-axis is perpendicular to the display screen. The preset angle includes an x-axis preset angle, a y-axis preset angle, and a z-axis preset angle.

The obtaining unit 502 is specifically configured to:

detect in real time movements in three directions: a direction of the x-axis, a direction of the y-axis, and a direction of the z-axis; and if a relative moving angle of the mobile terminal in one or more directions of the direction of the x-axis, the direction of the y-axis, and the direction of the z-axis exceeds a preset angle in a corresponding direction, determine that the moving angle of the mobile terminal exceeds the preset angle.

For example, the x-axis preset angle is 10 degrees, the y-axis preset angle is 5 degrees, and the z-axis preset angle is 15 degrees. If it is detected that the relative moving angle of the mobile terminal in the direction of the x-axis is 5 degrees, the relative moving angle in the direction of the y-axis is 6 degree, and the relative moving angle in the direction of the z-axis is 10 degrees, it is determined that the moving angle of the mobile terminal exceeds the preset angle.

Further, along the direction of the z-axis, the display screen of the mobile terminal may sequentially include a wallpaper layer, an image layer at which the desktop icon is located, and a display layer overlaying the wallpaper layer and the image layer at which the desktop icon is located. Horizontal coordinates of the display layer are in a one-to-one correspondence respectively with horizontal coordinates of the wallpaper layer and horizontal coordinates of the image layer at which the desktop icon is located. The z-axis is a coordinate axis perpendicular to the display screen of the mobile terminal. The horizontal coordinates include a coordinate in the direction of the x-axis and a coordinate in the direction of the y-axis. A horizontal plane on which the x-axis and the y-axis are located is parallel with the display screen.

The obtaining unit 502 is further configured to obtain, according to the obtained moving angle, a first area that is corresponding to the desktop icon and that is at the wallpaper layer.

Figure 5A:
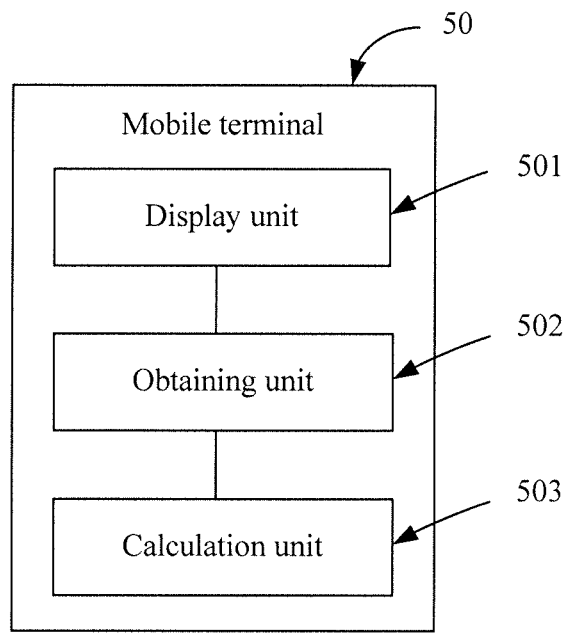
FIG. 5A is a structural diagram of a mobile terminal according to an embodiment of the present invention.

As shown in FIG. 5A, the mobile terminal 50 may further include:

a calculation unit 503, configured to perform combination calculation on color values of all coordinate points in the first area and color values of all coordinate points of the desktop icon, to form a series of combined color values that are in a one-to-one correspondence with horizontal coordinate points of the desktop icon.

A set of the color values of all the coordinate points of the desktop icon is the first color set. A set of the combined color values that are in a one-to-one correspondence with the horizontal coordinate points of the desktop icon is the second color set. The color values of all the coordinate points in the first area may be pre-stored in the mobile terminal, or when the wallpaper layer displays wallpaper, displayed values of the wallpaper in the area may serve as the color values of all the coordinate points in the first area.

The display unit 501 is further configured to respectively display, on the horizontal coordinates of the display layer, colors corresponding to the combined color values that are obtained after the combination calculation and that are corresponding to all the horizontal coordinate points of the desktop icon.

For example, for a first coordinate point (x,y) of the desktop icon, if a color value that is obtained after the combination calculation and that is corresponding to the first coordinate point is (0x223355), a color corresponding to the color value (0x223355) is displayed on a horizontal coordinate point (x,y) of the display layer.

Further, the obtaining unit 502 is specifically configured to:

obtain a first moving angle of a connection line between a preset reference object and the desktop icon in relative to the x-axis and a second moving angle of the connection line between the preset reference object and the desktop icon in relative to the y-axis; and obtain, according to the first moving angle, the second moving angle, and a distance between the wallpaper layer and the image layer at which the desktop icon is located, the first area that is corresponding to the desktop icon and that is at the wallpaper layer.

The preset reference object may be a reference object that has a fixed three-dimensional coordinate point and that is located inside or outside the mobile terminal, or may be a reference object whose coordinate point changes as the mobile terminal moves. A specific type of the reference object is not limited in this embodiment of the present invention. Only an object whose current three-dimensional coordinate point can be obtained is used as the reference object in the present invention.

Preferably, for a first coordinate point (x,y) of the desktop icon, obtaining a coordinate point (x1,y1) that is in the first area and that is corresponding to the first coordinate point may include:

obtaining, according to a formula $(x1,y1)=(x-Dx^{tan\ \alpha}, y-Dx^{tan\ \beta})$, the coordinate point (x1,y1) that is in the first area and that is corresponding to the first coordinate point.

D is the distance between the wallpaper layer and the image layer at which the desktop icon is located, "tan" is a tangent function, $\alpha$ is the first moving angle, and $\beta$ is the second moving angle.

Further, the calculation unit 503 is specifically configured to:

perform addition and/or subtraction calculation on a color value of each coordinate point in the first area and a color value of each coordinate point of the desktop icon; or filter out one or more color values from the color values of all the coordinate points in the first area first, and perform addition and/or subtraction calculation on a color value that is obtained after the filtering and that is of each coordinate point in the first area and a color value of each coordinate point of the desktop icon.

For example, color values are represented by using red, blue, and green. If a color value of a specific coordinate point in the first area is 0x223344 (red 0x22, blue 0x33, and green 0x44), and a color value of a coordinate point that is corresponding to the specific coordinate point and that is on the desktop icon is 0x556644 (red 0x55, blue 0x11, and green 0x66), a result obtained after combination calculation on the color value of the coordinate point in the first area and the color value of the coordinate point on the desktop icon may be: 0x223344+0x556644=0x779988, or 0x556644−0x223344=0x333300; or the red color is filtered out from the color value of the coordinate point in the first area first, and the color value of the coordinate point in the first area is changed to 0x003344; and the color value obtained after the filtering and the color value of the coordinate point of the desktop icon are added, and a result is: 0x003344+0x556644=0x559988; or the color value obtained after the filtering is subtracted from the color value of the coordinate point of the desktop icon, and a result is: 0x556644−0x003344=0x553300.

In this way, the calculation unit 403 may obtain the color values that are obtained after the combination calculation and that are in a one-to-one correspondence with the horizontal coordinate points of the desktop icon. For example, if a desktop icon includes 10 coordinate points, 10 color values that are in a one-to-one correspondence with the 10 coordinate points and that are obtained after combination calculation are obtained.

It can be learned from this that, this embodiment of the present invention provides a mobile terminal. When a moving angle of the mobile terminal exceeds a preset angle, an area that is corresponding to a desktop icon and that is at a wallpaper layer is obtained. After combination calculation is performed on a color value in the area and a first color set of the desktop icon, the desktop icon is displayed by using a second color value. In this way, when the mobile terminal continuously moves in different angles, a displayed color of the desktop icon continuously changes, so that a colorful lattice window effect may be dynamically presented on the desktop icon. This enhances a display effect of the desktop icon when the mobile terminal moves.

Embodiment 4

A mobile terminal provided in this embodiment of the present invention may be configured to implement the method shown in the foregoing method embodiments. For ease of description, only a part relevant to this embodiment of the present invention is illustrated. For undisclosed specific technical details, refer to description in the foregoing method embodiments.

Figure 6:
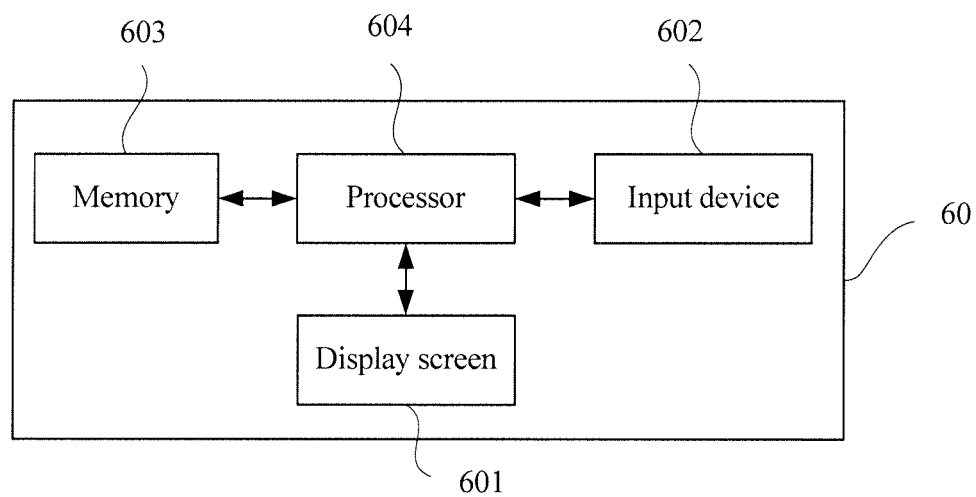
FIG. 6 is a structural diagram of another mobile terminal according to an embodiment of the present invention.

The mobile terminal may be a mobile phone, a tablet computer, a notebook computer, a UMPC, a netbook, a PDA, or the like. This embodiment of the present invention is described by using an example in which the mobile terminal is a mobile phone. FIG. 6 shows a block diagram of a partial structure of a mobile phone 60 related to this embodiment of the present invention.

As shown in FIG. 6, the mobile phone 60 includes components such as a display screen 601, one or more user input devices 602, a memory 603, and one or more processors 604 configured to execute one or more programs stored in a memory. A person skilled in the art may understand that a structure of the mobile phone shown in FIG. 6 constitutes no limitation on a mobile phone, and the mobile phone may include components more than those shown in FIG. 6, or a combination of some components, or different component arrangements.

With reference to FIG. 6, the following describes in detail each constitutive component of the mobile phone 60.

The display screen 601 is referred to as a touch display panel, and is configured to implement input and output functions of the mobile phone 60. The display screen 601 may collect a touch operation performed by a user on or nearby the display screen 601 (for example, an operation performed, on the display screen 601 or nearby the display screen 601, by a user using any suitable object or accessory, such as a finger, a stylus, or the like), and drive a corresponding connected apparatus according to a preset program. The display screen 601 may be further configured to display information input by a user or information provided for a user and various menus of the mobile phone. Optionally, the display screen 601 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into contact coordinates, and transfers the contact coordinates to the processor 604. Further, the touch controller can receive and execute a command sent by the processor 604. After detecting a touch operation on or nearby the display screen 601, the display screen 601 transfers the touch operation to the processor 604 to determine a type of a touch event. Subsequently, the processor 604 provides corresponding visual output on the display screen 601 according to the type of the touch event. In addition, the display screen 601 may be implemented in multiple types such as a resistive type, a capacitive type, infrared, and a surface acoustic wave.

The one or more user input devices 602 may be input keys installed on the mobile phone 60, or may be another input device connected to the mobile phone 60, such as a microphone and a keyboard.

The memory 603 may be configured to store data, a software program, and a module, and mainly includes a program storage area and a data storage area. The program storage area may store an operating system, an application program required by at least one function (such as a voice playing function or an image playing function), and the like. The data storage area may store data (such as audio data, image data, or a phonebook) created according to use of the mobile phone 60, and the like. In addition, the memory 603 may include a high-speed random access memory, and may further include a nonvolatile memory, such as at least one magnetic disk storage component, a flash memory component, or another volatile solid-state storage component.

The processor 604 is a control center of the mobile phone 60, and is connected to all parts of the entire mobile phone by using various interfaces and lines. The processor 604 executes various functions of the mobile phone 60 and processes data by running or executing the software program and/or the module that are/is stored in the memory 603 and by invoking data stored in the memory 603, so as to perform overall monitoring on the mobile phone. Optionally, the processor 604 may include one or more processing units. Preferably, the processor 604 may integrate an application processor and a modem processor. The application processor mainly processes an operating system, a user interface, an application program, and the like; and the modem processor mainly processes radio communication. It may be understood that the foregoing modem processor may be not integrated into the processor 604.

Although not shown in the figure, the mobile phone 60 may further include a WiFi (wireless fidelity, Wireless Fidelity) module, a Bluetooth module, a power supply (for example, a battery) supplying power to all components, and the like, and details are not described herein.

The processor 604 is configured to: display a desktop icon on the display screen 601 of the mobile terminal by using a first color set;

obtain a moving angle of the mobile terminal; and if the moving angle of the mobile terminal exceeds a preset angle, display the desktop icon by using a second color set.

The preset angle may be set according to a requirement, and this embodiment of the present invention sets no limitation thereto. The second color set includes color values that are different from first color values and that are in a one-to-one correspondence with all coordinate points of the desktop icon. It should be noted that colors in the second color set may be identical, or may be totally different, and this embodiment of the present invention sets no limitation thereto. In this embodiment of the present invention, when the mobile terminal moves, the desktop icon is displayed only by using the second color set that is different from the first color set.

Further, in this embodiment of the present invention, the display screen includes an x-axis and a y-axis in three-dimensional space. A z-axis is perpendicular to the display screen. The preset angle includes an x-axis preset angle, a y-axis preset angle, and a z-axis preset angle.

The processor 604 is specifically configured to:

detect in real time movements in three directions: a direction of the x-axis, a direction of the y-axis, and a direction of the z-axis; and if a relative moving angle of the mobile terminal in one or more directions of the direction of the x-axis, the direction of the y-axis, and the direction of the z-axis exceeds a preset angle in a corresponding direction, determine that the moving angle of the mobile terminal exceeds the preset angle.

For example, the x-axis preset angle is 10 degrees, the y-axis preset angle is 5 degrees, and the z-axis preset angle is 15 degrees. If it is detected that the relative moving angle of the mobile terminal in the direction of the x-axis is 5 degrees, the relative moving angle in the direction of the y-axis is 6 degree, and the relative moving angle in the direction of the z-axis is 10 degrees, it is determined that the moving angle of the mobile terminal exceeds the preset angle.

Further, in this embodiment of the present invention, along the direction of the z-axis, the display screen 601 sequentially includes a wallpaper layer, an image layer at which the desktop icon is located, and a display layer overlaying the wallpaper layer and the image layer at which the desktop icon is located. Horizontal coordinates of the display layer are in a one-to-one correspondence respectively with horizontal coordinates of the wallpaper layer and horizontal coordinates of the image layer at which the desktop icon is located. The z-axis is a coordinate axis perpendicular to the display screen of the mobile terminal. The horizontal coordinates include a coordinate in the direction of the x-axis and a coordinate in the direction of the y-axis. A horizontal plane on which the x-axis and the y-axis are located is parallel with the display screen.

The processor 604 is specifically configured to:

obtain, according to the obtained moving angle, a first area that is corresponding to the desktop icon and that is at the wallpaper layer;

perform combination calculation on color values of all coordinate points in the obtained first area and color values of all coordinate points of the desktop icon, to form a series of combined color values that are in a one-to-one correspondence with horizontal coordinate points of the desktop icon; and respectively display, on the horizontal coordinates of the display layer, colors that are corresponding to the combined color values obtained after the combination calculation and that are corresponding to all the horizontal coordinate points of the desktop icon.

A set of the color values of all the coordinate points of the desktop icon is the first color set. A set of the combined color values that are in a one-to-one correspondence with the horizontal coordinate points of the desktop icon is the second color set. The color values of all the coordinate points in the first area may be pre-stored in the mobile terminal, or when the wallpaper layer displays wallpaper, displayed values of the wallpaper in the area may serve as the color values of all the coordinate points in the first area.

Further, the processor 604 is specifically configured to:

obtain a first moving angle of a connection line between a preset reference object and the desktop icon in relative to the x-axis and a second moving angle of the connection line between the preset reference object and the desktop icon in relative to the y-axis; and obtain, according to the first moving angle, the second moving angle, and a distance between the wallpaper layer and the image layer at which the desktop icon is located, the first area that is corresponding to the desktop icon and that is at the wallpaper layer.

The preset reference object may be a reference object that has a fixed three-dimensional coordinate point and that is located inside or outside the mobile terminal, or may be a reference object whose coordinate point changes as the mobile terminal moves. A specific type of the reference object is not limited in this embodiment of the present invention. Only an object whose current three-dimensional coordinate point can be obtained is used as the reference object in the present invention.

Preferably, for a first coordinate point (x,y) of the desktop icon, obtaining a coordinate point (x1,y1) that is in the first area and that is corresponding to the first coordinate point may include:

obtaining, according to a formula $(x1,y1)=(x-D\times^{\tan \alpha}, y-D\times^{\tan \beta})$, the coordinate point (x1,y1) that is in the first area and that is corresponding to the first coordinate point.

D is the distance between the wallpaper layer and the image layer at which the desktop icon is located, "tan" is a tangent function, $\alpha$ is the first moving angle, and $\beta$ is the second moving angle.

Further, the processor 604 is specifically configured to: perform addition and/or subtraction calculation on a color value of each coordinate point in the first area and a color value of each coordinate point of the desktop icon; or filter out one or more color values from the color values of all the coordinate points in the first area first, and perform addition and/or subtraction calculation on a color value that is obtained after the filtering and that is of each coordinate point in the first area and a color value of each coordinate point of the desktop icon.

For example, color values are represented by using red, blue, and green. If a color value of a specific coordinate point in the first area is 0x223344 (red 0x22, blue 0x33, and green 0x44), and a color value of a coordinate point that is corresponding to the specific coordinate point and that is on the desktop icon is 0x556644 (red 0x55, blue 0x11, and green 0x66), a result obtained after combination calculation on the color value of the coordinate point in the first area and the color value of the coordinate point on the desktop icon may be: 0x223344+0x556644=0x779988, or 0x556644−0x223344=0x333300; or the red color is filtered out from the color value of the coordinate point in the first area first, and the color value of the coordinate point in the first area is changed to 0x003344; and the color value obtained after the filtering and the color value of the coordinate point of the desktop icon are added, and a result is: 0x003344+0x556644=0x559988; or the color value obtained after the filtering is subtracted from the color value of the coordinate point of the desktop icon, and a result is: 0x556644−0x003344=0x553300.

In this way, the processor 503 may obtain the color values that are obtained after the combination calculation and that are in a one-to-one correspondence with the horizontal coordinate points of the desktop icon. For example, if a desktop icon includes 10 coordinate points, 10 color values that are in a one-to-one correspondence with the 10 coordinate points and that are obtained after combination calculation are obtained.

It can be learned from this that, this embodiment of the present invention provides a mobile terminal. When a moving angle of the mobile terminal exceeds a preset angle, an area that is corresponding to a desktop icon and that is at a wallpaper layer is obtained. After combination calculation is performed on a color value in the area and a first color set of the desktop icon, the desktop icon is displayed by using a second color value. In this way, when the mobile terminal continuously moves in different angles, a displayed color of the desktop icon continuously changes, so that a colorful lattice window effect may be dynamically presented on the desktop icon. This enhances a display effect of the desktop icon when the mobile terminal moves.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A desktop icon display method, comprising:
   displaying a desktop icon on a display screen of a mobile terminal using a first color set;
   obtaining an angle of movement of the mobile terminal;
   displaying the desktop icon using a second color set when the angle of movement of the mobile terminal exceeds a preset angle, wherein along a z-axis, the display screen sequentially includes a display layer, an image layer at which the desktop icon is located, and a wallpaper layer, wherein the display layer overlays the wallpaper layer and the image layer, wherein the displaying the desktop icon using the second color set includes obtaining, according to a first angle of movement, a second angle of movement, and a first distance value representing a virtual distance between the wallpaper layer and the image layer, a first area that corresponds to the desktop icon and that is on the wallpaper layer, the virtual distance being set by a user, wherein obtaining the first area comprises obtaining, for a first coordinate point (x,y) of the desktop icon and according to the first angle of movement, the second angle of movement, and the first distance value, a coordinate point (x1,y1) that is in the first area and that corresponds to the first coordinate point of the desktop icon using the following formula:

$$(x1,y1)=(x-D\times\tan \alpha, y-D\times\tan \beta),$$

wherein D is the first distance value and is greater than zero, tan is a tangent function, $\alpha$ is the first angle of movement, and $\beta$ is the second angle of movement;
   determining a new color for the first coordinate point based on a color value of the coordinate point and a color value of the first coordinate point; and
   displaying the new determined color.

2. The method according to claim 1, wherein horizontal coordinates of the display layer are in a one-to-one correspondence, respectively, with horizontal coordinates of the wallpaper layer and horizontal coordinates of the image layer, wherein the z-axis is a coordinate axis perpendicular to the display screen, wherein the horizontal coordinates comprise a coordinate in a direction of an x-axis and a coordinate in a direction of a y-axis, wherein a horizontal plane on which the x-axis and the y-axis are located is parallel with the display screen, and wherein the displaying the desktop icon using the second color set further includes:
   performing combination calculation on color values of all coordinate points in the first area and color values of all coordinate points of the desktop icon to obtain a series of combined color values that are in a one-to-one correspondence with horizontal coordinate points of the desktop icon, wherein a set of the color values of all the coordinate points of the desktop icon is the first color set, and wherein a set of the combined color values that are in a one-to-one correspondence with the horizontal coordinate points of the desktop icon is the second color set; and respectively displaying, on the horizontal coordinates of the display layer, colors that correspond to the combined color values obtained after the combination calculation and that correspond to all the horizontal coordinate points of the desktop icon.

3. The method according to claim 2, wherein the performing combination calculation on the color values of all the coordinate points in the first area and the color values of all the coordinate points of the desktop icon includes:

performing addition or subtraction calculation on a color value of each coordinate point in the first area and a color value of each coordinate point of the desktop icon; or filtering out one or more color values from the color values of all the coordinate points in the first area.

4. The method according to claim 2, wherein the performing combination calculation on the color values of all the coordinate points in the first area and the color values of all the coordinate points of the desktop icon includes performing addition or subtraction calculation on a color value of each coordinate point in the first area and a color value of each coordinate point of the desktop icon.

5. The method according to claim 2, wherein the performing combination calculation on the color values of all the coordinate points in the first area and the color values of all the coordinate points of the desktop icon includes:

filtering out one or more color values from the color values of all the coordinate points in the first area; and performing addition or subtraction calculation on a first color value of each coordinate point of the desktop icon and a second color value that is obtained after the filtering and that corresponds to each coordinate point in the first area.

6. The method according to claim 2, wherein the performing combination calculation on the color values of all the coordinate points in the first area and the color values of all the coordinate points of the desktop icon includes performing addition or subtraction calculation on a color value of each coordinate point in the first area and a color value of each coordinate point of the desktop icon.

7. The method according to claim 2, wherein the performing combination calculation on the color values of all the coordinate points in the first area and the color values of all the coordinate points of the desktop icon includes filtering out one or more color values from the color values of all the coordinate points in the first area.

8. A mobile terminal, comprising:
a memory comprising instructions; and
a processor coupled to the memory and configured to execute the instructions, which causes the processor to be configured to:

display a desktop icon on a display screen of the mobile terminal using a first color set;

obtain an angle of movement of the mobile terminal;

display the desktop icon using a second color set when the angle of movement of the mobile terminal exceeds a preset angle, wherein along a z-axis, the display screen sequentially includes a display layer, an image layer at which the desktop icon is located, and a wallpaper layer, wherein the display layer overlays the wallpaper layer and the image layer, wherein the processor is configured to display the desktop icon using the second color set by being configured to obtain, according to a first angle of movement, a second angle of movement, and a first distance value representing a virtual distance between the wallpaper layer and the image layer, a first area that corresponds to the desktop icon and that is on the wallpaper layer, the virtual distance being set by a user, wherein the processor is configured to obtain the first area by being configured to obtain, for a first coordinate point (x,y) of the desktop icon and according to the first angle of movement, the second angle of movement, and the first distance value, a coordinate point (x1,y1) that is in the first area and that corresponds to the first coordinate point of the desktop icon using the following formula:

$$(x1,y1)=(x-D\times\tan \alpha, y-D\times\tan \beta),$$

wherein D is the first distance value and is greater than zero, tan is a tangent function, $\alpha$ is the first angle of movement, and $\beta$ is the second angle of movement;

determine a new color for the first coordinate point based on a color value of the coordinate point and a color value of the first coordinate point; and display the new determined color.

9. The mobile terminal according to claim 8, wherein horizontal coordinates of the display layer are in a one-to-one correspondence respectively with horizontal coordinates of the wallpaper layer and horizontal coordinates of the image layer, wherein the z-axis is a coordinate axis perpendicular to the display screen wherein the horizontal coordinates comprise a coordinate in a direction of an x-axis and a coordinate in a direction of a y-axis, wherein a horizontal plane on which the x-axis and the y-axis are located is parallel with the display screen, and wherein the processor is further configured to:

perform combination calculation on color values of all coordinate points in the first area obtained by the processor and color values of all coordinate points of the desktop icon to form a series of combined color values that are in a one-to-one correspondence with horizontal coordinate points of the desktop icon, wherein a set of the color values of all the coordinate points of the desktop icon is the first color set, and wherein a set of the combined color values that are in a one-to-one correspondence with the horizontal coordinate points of the desktop icon is the second color set; and display, on the horizontal coordinates of the display layer, colors that correspond to the combined color values obtained after the combination calculation and that correspond to all the horizontal coordinate points of the desktop icon.

10. The mobile terminal according to claim 9, wherein the processor is further configured to:

perform addition or subtraction calculation on a color value of each coordinate point in the first area and a color value of each coordinate point of the desktop icon; or filter out one or more color values from the color values of all the coordinate points in the first area, and perform addition or subtraction calculation on a first color value of each coordinate point of the desktop icon and a second color value that is obtained after the filtering and that corresponds to each coordinate point in the first area.

11. The mobile terminal according to claim 9, wherein the processor is further configured to perform addition or subtraction calculation on a color value of each coordinate point in the first area and a color value of each coordinate point of the desktop icon.

12. The mobile terminal according to claim 9, wherein the processor is further configured to filter out one or more color values from the color values of all the coordinate points in the first area and perform addition or subtraction calculation on a first color value of each coordinate point of the desktop icon and a second color value that is obtained after the filtering and that corresponds to each coordinate point in the first area.

13. The mobile terminal according to claim 8, wherein the processor is further configured to perform addition or subtraction calculation on a color value of each coordinate point in the first area and a color value of each coordinate point of the desktop icon.

14. The mobile terminal according to claim 8, wherein the processor is further configured to filter out one or more color values from color values of all coordinate points in the first area, and perform addition or subtraction calculation on a color value that is obtained after the filtering and that is of each coordinate point in the first area and a color value of each coordinate point of the desktop icon.

15. A mobile terminal, comprising:
a display screen;
one or more user input devices;
a memory comprising one or more programs; and
one or more processors coupled to the display screen, the one or more user input devices, and the memory, wherein the one or more processors are configured to execute the one or more programs stored in the memory to cause the one or more processors to:
display a desktop icon on the display screen of the mobile terminal by using a first color set;
obtain an angle of movement of the mobile terminal;
display the desktop icon using a second color set when the angle of movement of the mobile terminal exceeds a preset angle, wherein along a z-axis, the display screen sequentially includes a display layer, an image layer at which the desktop icon is located, and a wallpaper layer, wherein the display layer overlays the wallpaper layer and the image layer, wherein the one or more processors are configured to display the desktop icon using the second color set by being configured to obtain, according to a first angle of movement, a second angle of movement, and a first distance value representing a virtual distance between the wallpaper layer and the image layer, a first area that corresponds to the desktop icon and that is on the wallpaper layer, the virtual distance being set by a user, wherein the one or more processors are configured to obtain the first area by being configured to obtain, for a first coordinate point (x,y) of the desktop icon and according to the first angle of movement, the second angle of movement, and the first distance value, a coordinate point (x1,y1) that is in the first area and that corresponds to the first coordinate point of the desktop icon using the following formula:

$(x1, y1) = (x - D \times \tan \alpha, y - D \times \tan \beta)$, wherein D is the first distance value and is greater than zero, tan is a tangent function, α is the first angle of movement, and β is the second angle of movement;
determine a new color for the first coordinate point based on a color value of the coordinate point and a color value of the first coordinate point; and
display the new determined color.

16. The mobile terminal according to claim 15, wherein horizontal coordinates of the display layer are in a one-to-one correspondence respectively with horizontal coordinates of the wallpaper layer and horizontal coordinates of the image layer, wherein the z-axis is a coordinate axis perpendicular to the display screen, wherein the horizontal coordinates comprise a coordinate in a direction of an x-axis and a coordinate in a direction of a y-axis, wherein a horizontal plane on which the x-axis and the y-axis are located is parallel with the display screen, and wherein the one or more processors are further configured to:
perform combination calculation on color values of all coordinate points in the obtained first area and color values of all coordinate points of the desktop icon to form a series of combined color values that are in a one-to-one correspondence with horizontal coordinate points of the desktop icon, wherein a set of the color values of all the coordinate points of the desktop icon is the first color set, and a set of the combined color values that are in a one-to-one correspondence with the horizontal coordinate points of the desktop icon is the second color set; and
respectively display, on the horizontal coordinates of the display layer, colors that correspond to the combined color values obtained after the combination calculation and that correspond to all the horizontal coordinate points of the desktop icon.

17. The mobile terminal according to claim 16, wherein the one or more processors are further configured to:
perform addition or subtraction calculation on a color value of each coordinate point in the first area and a color value of each coordinate point of the desktop icon; or
filter out one or more color values from the color values of all the coordinate points in the first area, and perform addition or subtraction calculation on a first color value of each coordinate point of the desktop icon and a second color value that is obtained after the filtering and that corresponds to each coordinate point in the first area.

18. The mobile terminal according to claim 16, wherein the one or more processors are further configured to:
perform addition or subtraction calculation on a color value of each coordinate point in the first area and a color value of each coordinate point of the desktop icon; or
filter out one or more color values from the color values of all the coordinate points in the first area, and perform addition subtraction calculation on a color value that is obtained after the filtering and that is of each coordinate point in the first area and a color value of each coordinate point of the desktop icon.

* * * * *